(12) United States Patent
Kaiser et al.

(10) Patent No.: US 11,827,254 B2
(45) Date of Patent: Nov. 28, 2023

(54) TRACK MEASURING VEHICLE AND METHOD FOR RECORDING A TRACK GEOMETRY OF A TRACK

(71) Applicant: PLASSER & THEURER EXPORT VON BAHNBAUMASCHINEN GMBH, Vienna (AT)

(72) Inventors: Christoph Kaiser, St. Stefan Am Walde (AT); Robert Kaiser, Haslach An der Muehl (AT)

(73) Assignee: Plasser & Theurer Export von Bahnbaumaschinen GmbH, Vienna (AT)

( * ) Notice: Subject to any disclaimer, the term of this patent is extended or adjusted under 35 U.S.C. 154(b) by 1205 days.

(21) Appl. No.: 16/464,786

(22) PCT Filed: Nov. 27, 2017

(86) PCT No.: PCT/EP2017/080505
§ 371 (c)(1),
(2) Date: May 29, 2019

(87) PCT Pub. No.: WO2018/114233
PCT Pub. Date: Jun. 28, 2018

(65) Prior Publication Data
US 2019/0344813 A1    Nov. 14, 2019

(30) Foreign Application Priority Data
Dec. 19, 2016 (AT) .................. A 573/2016

(51) Int. Cl.
*G01B 11/26* (2006.01)
*B61K 9/08* (2006.01)
(Continued)

(52) U.S. Cl.
CPC .............. *B61K 9/08* (2013.01); *B61L 23/042* (2013.01); *E01B 35/00* (2013.01); *G01B 11/26* (2013.01); *E01B 2203/06* (2013.01)

(58) Field of Classification Search
CPC ......... B61K 9/08; B61L 23/042; E01B 35/00; E01B 2203/16; G01B 11/26
See application file for complete search history.

(56) References Cited

U.S. PATENT DOCUMENTS

| 4,654,973 A | 4/1987 | Worthy |
| 5,113,767 A | 5/1992 | Theurer |

(Continued)

FOREIGN PATENT DOCUMENTS

| CN | 1054461 A | 9/1991 |
| CN | 202298394 U | 7/2012 |

(Continued)

*Primary Examiner* — Yaritza Guadalupe-McCall
(74) *Attorney, Agent, or Firm* — Laurence A. Greenberg; Werner H. Stemer; Ralph E. Locher

(57) ABSTRACT

A track measuring vehicle for recording a track geometry of a track includes a vehicle frame which has rail undercarriages and is mobile on two rails of a track. The vehicle also includes a first measuring base on which are arranged an inertial measuring unit and, for a position determination relative to each rail, at least one contact-less position measuring device. A lowerable second measuring base has measuring running wheels designed to be set upon the rails and is connected to the first measuring base via compensation measuring devices.

15 Claims, 2 Drawing Sheets

(51) Int. Cl.
    *B61L 23/04*      (2006.01)
    *E01B 35/00*      (2006.01)

(56) References Cited

U.S. PATENT DOCUMENTS

| | | | |
|---|---|---|---|
| 5,199,176 | A | 4/1993 | Theurer et al. |
| 5,203,089 | A | 4/1993 | Trefouel et al. |
| 6,725,782 | B1 | 4/2004 | Bloom et al. |
| 7,979,995 | B2* | 7/2011 | Theurer ................... E01B 35/00 33/287 |
| 9,459,624 | B2* | 10/2016 | Kuklish ................ G03B 17/561 |
| 9,810,533 | B2* | 11/2017 | Fosburgh .............. B61L 23/041 |
| 10,037,034 | B2* | 7/2018 | Kuklish ................ G03B 17/561 |
| 10,459,001 | B2* | 10/2019 | Foerster ................. B60T 8/172 |
| 10,589,763 | B2* | 3/2020 | Buerger ................. G01C 11/06 |
| 10,619,313 | B2* | 4/2020 | Fruehwirt ............... E01B 35/06 |
| 10,954,637 | B2* | 3/2021 | Kaiser ..................... E01B 35/04 |
| 11,014,587 | B2* | 5/2021 | Corbin .................... G01P 15/18 |
| 11,433,930 | B2* | 9/2022 | Buerger .................. E01B 35/00 |
| 11,566,383 | B2* | 1/2023 | Wollanek ............... B61L 23/047 |
| 2004/0122569 | A1 | 6/2004 | Bidaud |
| 2010/0154233 | A1* | 6/2010 | Theurer ................... E01B 35/00 33/287 |
| 2019/0257038 | A1* | 8/2019 | Wollanek ............... E01B 35/00 |
| 2019/0344813 | A1* | 11/2019 | Kaiser .................... B61L 23/042 |
| 2019/0375438 | A1* | 12/2019 | Auer ..................... B61L 23/047 |
| 2020/0361502 | A1* | 11/2020 | Metzger .................. E01B 35/06 |
| 2021/0146970 | A1* | 5/2021 | Buerger .................. B61L 23/04 |
| 2021/0222373 | A1* | 7/2021 | Lichtberger ............ E01B 35/00 |
| 2022/0266881 | A1* | 8/2022 | Auer ...................... B61L 25/025 |
| 2023/0022877 | A1* | 1/2023 | Schuster ................. B61L 23/06 |

FOREIGN PATENT DOCUMENTS

| | | |
|---|---|---|
| CN | 106092056 A | 11/2016 |
| DE | 3914830 A1 | 11/1990 |
| DE | 4136904 A1 | 5/1992 |
| WO | 2008122319 A1 | 10/2008 |

* cited by examiner

TRACK MEASURING VEHICLE AND METHOD FOR RECORDING A TRACK GEOMETRY OF A TRACK

FIELD OF TECHNOLOGY

The invention relates to a track measuring vehicle for recording a track geometry of a track, including a vehicle frame which has rail undercarriages and is mobile on two rails of a track, and including a first measuring base on which are arranged an inertial measuring unit and, for a position determination relative to each rail, at least one contact-less position measuring device. The invention further relates to a method for operating such a track measuring vehicle.

PRIOR ART

For maintenance of the track permanent way, regular controls are required. To that end, the track is traversed periodically by a track measuring device in the shape of a track measuring vehicle which records the track geometry in order to subsequently evaluate the same. Since the track geometry directly affects the driving dynamics of a vehicle travelling on rails, a precise measurement is crucial for evaluation of the railway safety. Therefore, track measuring vehicles have long been known.

Frequently, measuring systems having mechanical sensors are used which are in constant contact with the track via movable spot feelers. From the motion of the sensors, it is possible in further sequence to derive the track geometry. Such a device is known, for example, from DE 39 14 830 A1.

In the case of newer optical and inertial measuring systems, contact-less laser sensors are used for deriving the desired track geometry measurement data. The vertical track position is calculated from a difference of two distance measurement values which make reference to a coordinate system. Thus, the speed restrictions inherent in mechanical measuring systems are overcome also.

However, as a result of snow- or sand drifts on the track, the optical measuring systems are pushed to their limits and thus are not able any more to record the track geometry correctly. From DE 41 36 904 A1, for example, a device for contact-less distance measurement of rails of a track is known. An inertial measuring system is described in the trade journal Eisenbahningenieur (52) September 2001 on pages 6 to 9.

SUMMARY OF THE INVENTION

It is the object of the invention to indicate an improvement over the prior art for a track measuring vehicle of the type mentioned at the beginning. A further object lies in presenting a method for operation of an improved track measuring vehicle.

According to the invention, these objects are achieved by way of a track measuring vehicle as claimed and a method as claimed. Dependent claims indicate advantageous embodiments of the invention.

The invention provides that a lowerable second measuring base is arranged which comprises measuring running wheels designed to be set upon the rails and which is connected to the first measuring base via compensation measuring devices. Thus it is possible, as soon as the contact-less position measuring devices reach their limits as a result of heavy rain and snow- or sand drifts, for example, to continue the track measurement seamlessly by means of the lowerable mechanical second measuring base. During this, the compensation measuring devices register continuously a position change of the second measuring base relative to the inertial measuring unit. Thus, the track geometry can be derived in a simple manner from the measurement data of the inertial measuring unit.

An advantageous embodiment of the invention provides that, for the position determination relative to the respective rail, two position measuring devices spaced from one another are arranged on the first measuring base. Thus, no minimum speed of the track measuring vehicle is necessary, as would be the case with a one-point measurement per rail. An incline or a descent, and thus the longitudinal level of the particular rail, can thus be measured also when the vehicle is standing still or starting up.

In an advantageous further development, the position measuring devices are designed as laser line scanners. Here, the advantage lies in a very short reaction time and measuring frequency of the laser line scanner.

A further advantageous embodiment is that the compensation measuring devices are designed as path- and/or angle measuring devices. With this, the relative movement between the first and the second measuring base can be registered precisely.

A further improvement of the device according to the invention provides that the first measuring base is configured as a chassis frame of a rail undercarriage. Thus, no additional measuring frame is required.

In an advantageous further development, the second measuring base comprises a first telescopic axle with two measuring running wheels which is mounted on the chassis frame in a lowerable manner. The second measuring base is lowered onto the track when needed, wherein an adjustment to the gauge of the track takes place by means of the telescopic axle.

In an advantageous embodiment of the invention it is provided that the second measuring base comprises a second telescopic axle with two measuring running wheels which is mounted for rotation about a longitudinal axis of the track vehicle relative to the first telescopic axle. Thus it is possible to measure the relative movement with respect to the first telescopic axle, such as occurs in track super-elevations, for example. Again, a further advantage here is that no minimum speed of the track measuring vehicle is required to that end.

Further it is useful if a pneumatic drive for pressing the measuring running wheels laterally to the rails is associated with the respective telescopic axle. With this, a precise tracing of the rail course and a perfect measuring result are achieved.

A simple embodiment of the invention provides that the second measuring base is connected to the chassis frame via pneumatic drives. The respective pneumatic drive allows a power-less hold with constant force, whereby the second measuring base is pressed constantly to the rails.

A further advantageous embodiment of the invention is provided in that the track measuring vehicle comprises an evaluation device which is designed for evaluating the measurement results of the inertial measuring unit, the position measuring devices and the compensation measuring devices. This central evaluation device thus processes the data of the optical and also the mechanical measurements.

For spatial position recording, it is useful if the track measuring vehicle comprises a GNNS antenna for receiving signals of a global navigation satellite system. With this, a simple spatial allocation of the measurement results can be achieved.

A further improvement of the invention provides that the second measuring base can be locked in a raised position by means of a safety device. With this it is possible to appropriately secure the second measuring base in a raised inoperative position when using the contact-less position measuring devices.

Preferably, the safety device is designed as a securing hook, which presents a structurally simple yet still effective solution.

The method according to the invention provides that, during a run of the track measuring vehicle, a spatial curve is recorded by means of the inertial measuring unit, that in a first operating mode the spatial curve is transformed by means of measurement data of the position measuring devices into a spatial curve corresponding to the track course, and that in a second operating mode with lowered second measuring base, the spatial curve is transformed by means of measurement data of the compensation measuring devices into a spatial curve corresponding to the track course. Here it is advantageous that in both operating modes a common inertial measuring unit is utilized for recording the spatial curve.

In a further embodiment of the method it is provided that there is an automatic switching between the first and second operating mode in dependence on a measuring signal. If, due to aggravated conditions, the position measuring devices should be unable to record a precise measurement result, then there is an automatic switch-over into the second operating mode. This also goes for the reverse sequence; if the conditions on the track allow an optical measurement again, there is an automatic switch-over from the second to the first operating mode.

BRIEF DESCRIPTION OF THE DRAWINGS

The invention will be described by way of example below with reference to the attached figures. There is shown in schematic representation in.

DESCRIPTION OF THE EMBODIMENTS

Figure 1:
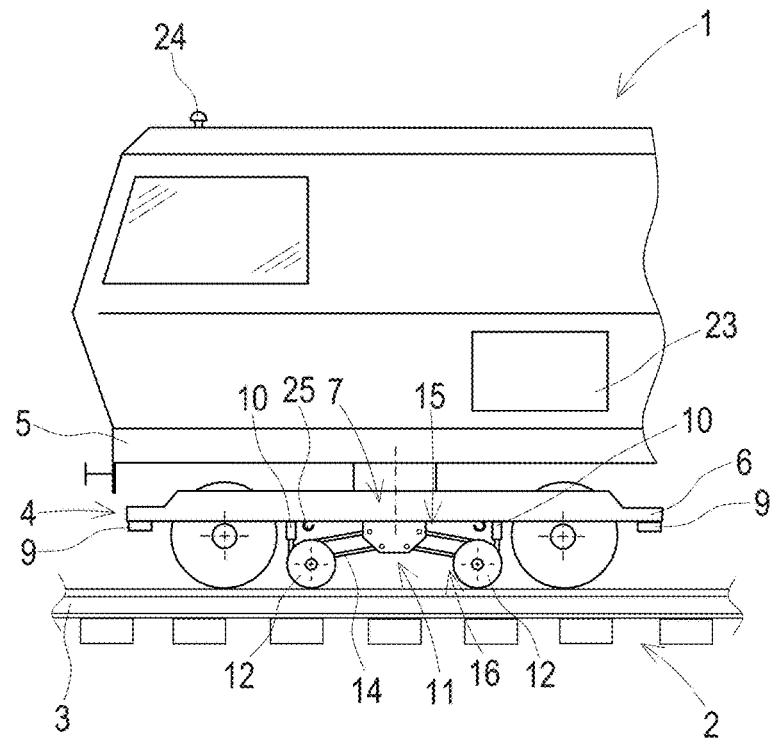
FIG. 1 a track measuring vehicle including a bogie,
FIG. 2 a 3D-view of the first and second measuring base, and
FIG. 3 a view of the bogie from below.

A track measuring vehicle 1 for recording a track geometry of a track 2, shown in a simplified way in FIG. 1, has rail undercarriages 4 mobile on rails 3 and a vehicle frame 5 supported thereon and comprises a first measuring base 7 designed as a chassis frame 6, including an inertial measuring unit 8 and position measuring devices 9, and a second measuring base 11 designed to be lowered by means of first pneumatic drives 10.

The second measuring base 11 has measuring running wheels 12 designed to be set on the rails 3 and is connected to the first measuring base 7 via coupling rods 14. At their upper end 15, the coupling rods 14 are rotatably mounted on the first measuring base 7 and are connected at their lower end 16 in each case to a first telescopic axle 17 and to a second telescopic axle 18. The first telescopic axle 17 is mounted for rotation about a track vehicle longitudinal axis 19 relative to the second telescopic axle 18 (FIG. 2).

On the chassis frame 6, brackets 26 may be arranged on which the first pneumatic drives 10 are supported. Thus it is possible to retrofit already existing rail undercarriages 4 and the frame of the first measuring base 7 with consoles 26.

A GNNS antenna 24 for receiving signals of a global navigation satellite system and an evaluation device 23 are arranged on the track measuring vehicle 1. In a raised position, the second measuring base 11 is locked by way of safety devices 25 which are preferably designed as securing hooks.

Figure 2:
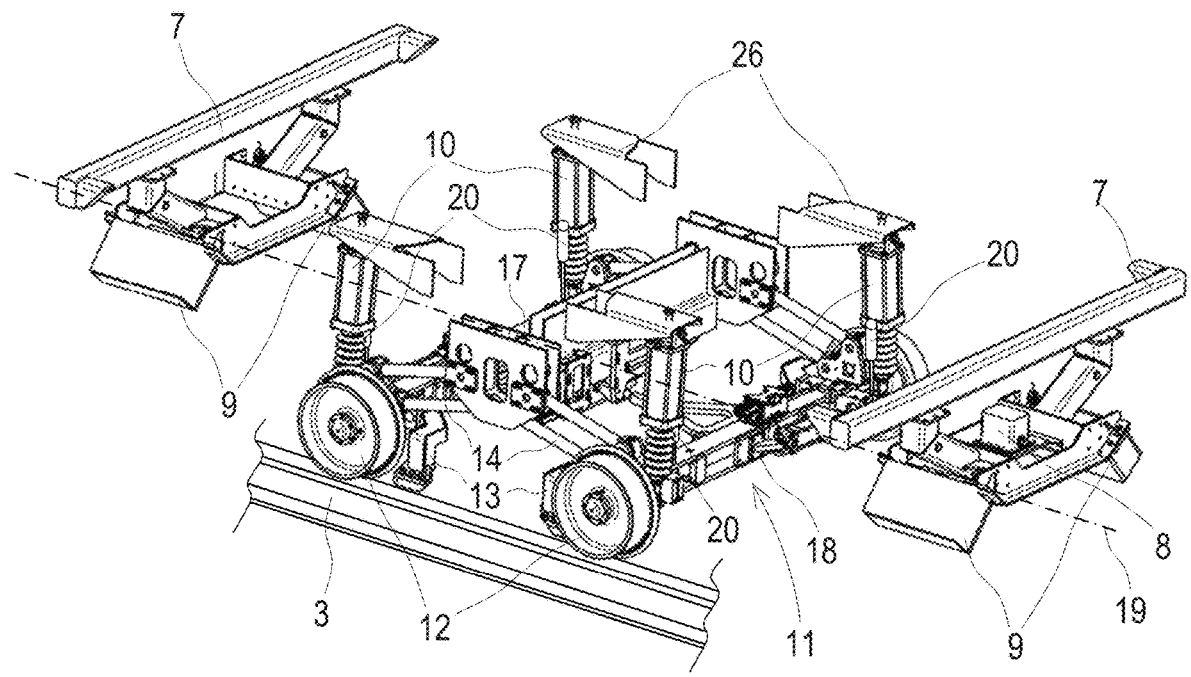

FIG. 2 shows a part of the first measuring base 7 and the second measuring base 11 in the lowered state. At the ends of the rail undercarriage 4, position measuring devices 9 are fastened to an underside of the first measuring base 7. These are preferably designed as laser line scanners, wherein two laser line scanners in each case are directed against an inner edge of a rail 3.

On the first measuring base 7, the inertial measuring unit 8 is preferably arranged centrally between two position measuring devices 9 in order to record a spatial curve in the track center. Thus, a rigid device is formed by the first measuring base 7 together with the chassis frame 6, the position measuring devices 9 and the inertial measuring unit 8. In the first operating mode, the position of the first measuring base 7 relative to the rails is continuously recorded by means of the position measuring devices 9.

In the second operating mode, the second measuring base 11 is lowered onto the track 2 by means of the first pneumatic drives 10. Arranged as compensation measuring devices on the first pneumatic drives 10 in each case is a first path measuring device 20. With this, a vertical relative movement between the first measuring base 7 and the second measuring base 11 is registered. Alternatively, an angle measuring device can also be attached to the coupling rods 14 for registering the relative movement.

Figure 3:
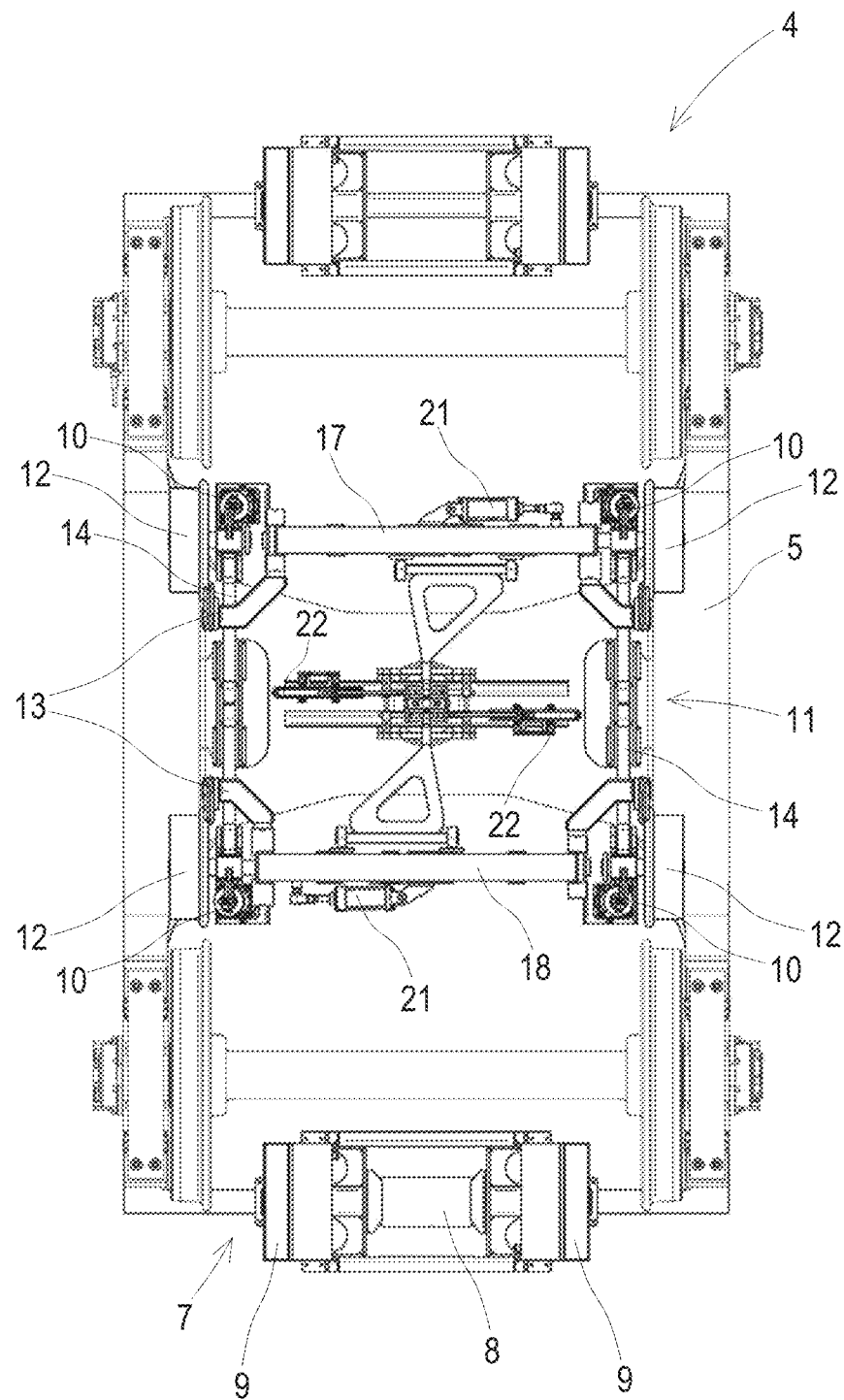

FIG. 3 shows a view of the rail undercarriage 4 from below. A second pneumatic drive 21 is arranged in each case on the telescopic axles 17, 18 for pressing the measuring running wheels 12 laterally to the rails 3. In order to prevent a measuring running wheel 12 from being pressed into a rail gap when traversing a switch or crossing, a guiding bar 13 is associated with each measuring running wheel 12. As soon as the latter is guided along a check rail, it holds the associated measuring running wheel 12 back and thus counteracts the closing pressure.

Centrally between the telescopic measuring axles 17, 18, second path measuring devices 22 are arranged as compensation measuring devices which record a lateral displacement of the second measuring base 11 relative to the first measuring base 7. In this manner, in the second operating mode, the position of the first measuring base 7 with respect to the rails 3 is registered by means of the mechanical compensation measuring devices 20, 22.

In a variant not shown, the first measuring base 7—uncoupled from the undercarriage 4—is attached as a frame to the wheel axles of the rail wheels. As a result, a direct measuring operation of the vertical course of the rail is possible, and only a lateral relative movement of the first measuring base 7 relative to the rails 3 needs to be registered.

The measuring signals of the inertial measuring unit 8, the contact-less position measuring devices 9 and the compensation measuring devices 20, 22 are fed to the evaluation device 23. Advantageously during this, a plausibility check of the signals of the position measuring devices 9 is carried out continuously. As soon as signal jumps or signal losses are detected, the second measuring base 11 is lowered and switched over from the first operating mode into the second operating mode.

The invention claimed is:

1. A track measuring vehicle for recording a track geometry of a track, the track measuring vehicle comprising:
   a vehicle frame having rail undercarriages and being mobile on two rails of a track;
   a first measuring base carrying thereon an inertial measuring unit and, for a position determination relative to each rail, at least one contact-less position measuring device;
   a second measuring base, being a lowerable measuring base with measuring running wheels configured to be set upon the rails, and being connected to said first measuring base via compensation measuring devices.

2. The track measuring vehicle according to claim 1, wherein said at least one contact-less position measuring device is one of two position measuring devices spaced from one another on said first measuring base and configured for determining a position relative to a respective rail.

3. The track measuring vehicle according to claim 2, wherein said position measuring devices are laser line scanners.

4. The track measuring vehicle according to claim 2, wherein said compensation measuring devices are path and/or angle measuring devices.

5. The track measuring vehicle according to claim 1, wherein said first measuring base is a chassis frame of a rail undercarriage.

6. The track measuring vehicle according to claim 5, wherein said second measuring base comprises a first telescopic axle with two measuring running wheels which is mounted on the chassis frame for lowering relative thereto.

7. The track measuring vehicle according to claim 6, wherein said second measuring base further comprises a second telescopic axle with two measuring running wheels which is mounted for rotation about a longitudinal axis of the track vehicle relative to said first telescopic axle.

8. The track measuring vehicle according to claim 7, which further comprises a second pneumatic drive associated with the respective said telescopic axle and configured for pressing said measuring running wheels laterally to the rails.

9. The track measuring vehicle according to claim 5, which further comprises first pneumatic drives connecting said second measuring base to said chassis frame.

10. The track measuring vehicle according to claim 1, further comprising an evaluation device configured for evaluating measurement results of said inertial measuring unit, of said position measuring devices, and of said compensation measuring devices.

11. The track measuring vehicle according to claim 1, further comprising a GNSS antenna for receiving signals of a global navigation satellite system.

12. The track measuring vehicle according to claim 1, further comprising a safety device configured to lock said second measuring base in a raised position.

13. The track measuring vehicle according to claim 12, wherein said safety device is a securing hook.

14. A method of operating a track measuring vehicle, the method comprising:
   providing a track measuring vehicle according to claim 1;
   during a run of the track measuring vehicle, recording a spatial curve with the inertial measuring unit;
   in a first operating mode, transforming the spatial curve by way of measurement data of the position measuring devices into a spatial curve corresponding to a track course; and
   in a second operating mode, with a lowered second measuring base, transforming the spatial curve by way of measurement data of the compensation measuring devices into a spatial curve corresponding to the track course.

15. The method according to claim 14, which comprises automatically switching between the first operating mode and the second operating mode in dependence on a measuring signal.

* * * * *